INVENTOR.
HAYES B. STEINHAUSER

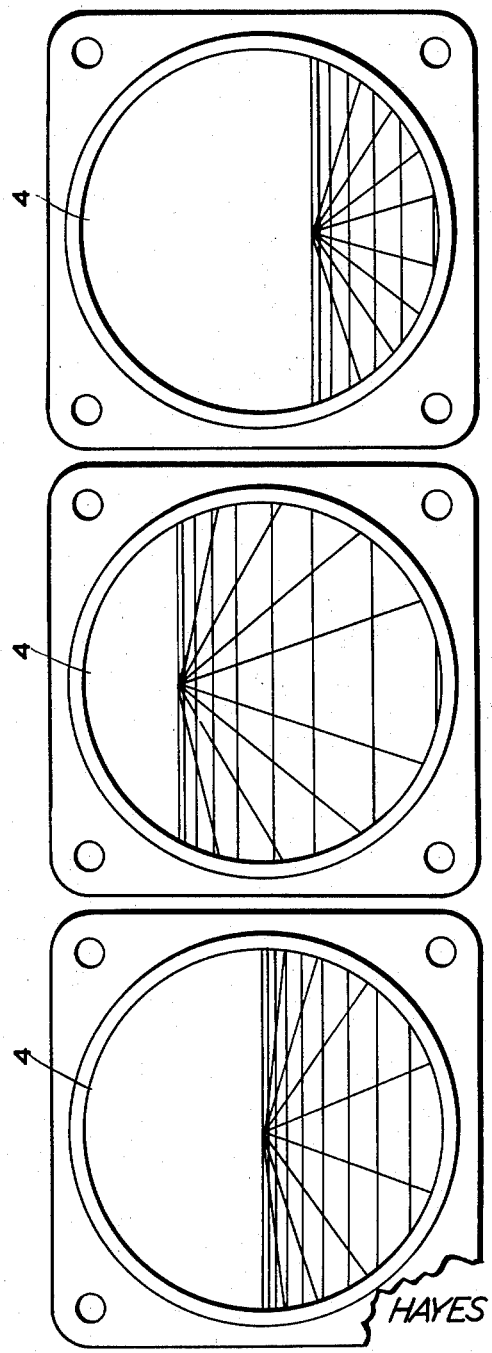

United States Patent Office 2,967,263
Patented Jan. 3, 1961

2,967,263
SIMULATED GROUND DISPLAY

Hayes B. Steinhauser, Lincoln Park, N.J., assignor to The Bendix Corporation, a corporation of Delaware Filed Jan. 6, 1958, Ser. No. 707,363

18 Claims. (Cl. 315—26)

This invention relates to flight instruments and more particularly to instruments for providing a pictorial presentation of flight data on a screen.

Conventional instruments heretofore known for presenting flight data to the pilot of a craft have utilized dials and pointers or moving strips and numbers which require the pilot to convert numerical values into usable form to determine flight characteristics of the craft.

In high speed aircraft in use today by the time the pilot converts the information to usable form, the aircraft assumes new flight parameters and the information is obsolete before it is used.

One object of the invention is to provide a simulated frame of reference in which the flight parameters are presented in usable form.

Another object of the invention is to provide a simulated frame of reference which indicates pictorially the craft's pitch attitude and speed.

Another object of the invention is to display on a cathode ray tube in an aircraft a grid pattern to simulate the ground in perspective and indicate the speed and pitch attitude of the craft.

The invention contemplates presenting on a cathode ray tube a series of lines to represent a grid pattern of the ground in perspective and which comprises a series of transverse and longitudinal perspective lines. The transverse perspective lines are shown on the tube as horizontal lines positioned one below another at increasing distances and with the uppermost line indicating the horizon and coinciding with the horizontal centerline of the tube when the craft is in level flight. The longitudinal perspective lines are shown on the tube as a series of lines converging at a point on the uppermost horizontal line and the lines are spaced from one another at decreasing distances about a vertical centerline of the tube. The horizontal lines move downwardly at a rate proportional to the speed of the craft to pictorially indicate to the pilot the speed at which the craft is flying. The display, including the horizon line, moves above the horizontal centerline of the tube when the plane dives and moves below the horizontal centerline of the tube when the plane climbs.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:

Figures 1 to 3 are front views of an instrument showing the presentation on a screen for various flight conditions;

Figure 4:
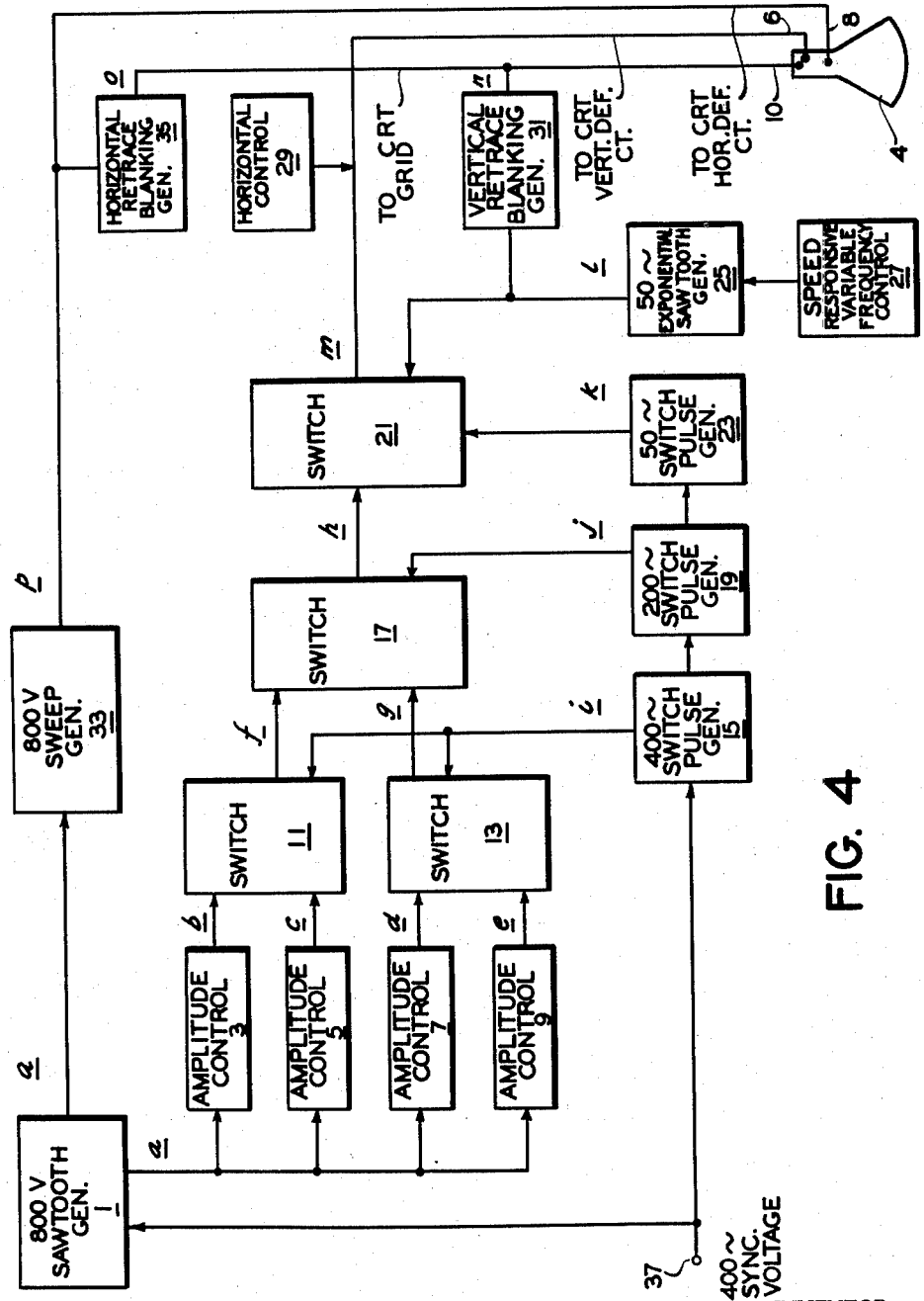
Figure 4 is a block diagram of the electrical components of an instrument constructed according to the invention.

Referring to the drawings, Figures 1 to 3 show the presentation for various flight attitudes on a device constructed according to the invention.

A picture as shown in Figure 1 is obtained on the face of a cathode ray tube 4 when the craft is in level flight. The uppermost horizontal or horizon line coincides with the horizontal centerline of the tube and the lines therebelow are spaced at increasing distances to give the impression of perspective. The longitudinal lines converge at a point on the horizon line. The picture shown is essentially what the pilot would see if he were to look out of a window at a grid pattern on the ground. The horizontal lines roll or move from the top to the bottom of the display at a rate that correspondings to the speed of the craft to create the impression of forward motion. The portion of the picture above the uppermost horizontal or horizon line represents the sky.

The picture shown in Figure 2 is obtained when the craft is in a dive. The display moves upward an amount corresponding to the change in pitch attitude of the craft.

The picture shown in Figure 3 is obtained when the craft is in a climb. The display moves downward an amount corresponding to the change in pitch attitude of the craft.

Figure 5:
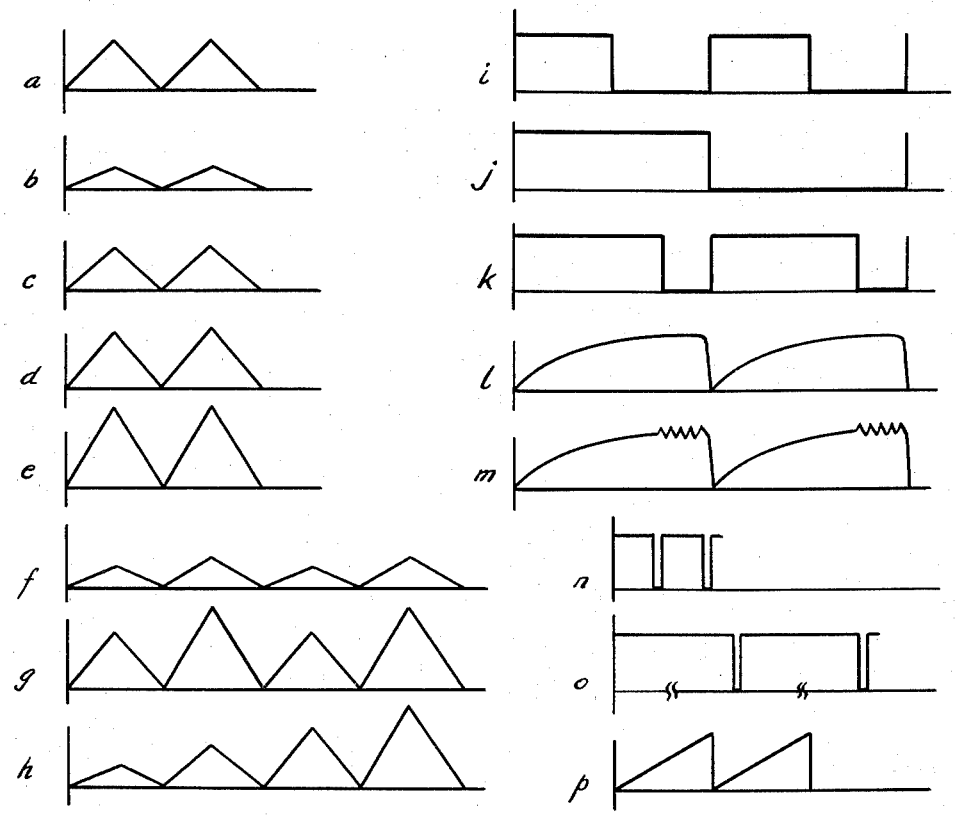
Figure 5 shows voltage wave forms generated by various components in the system of Figure 4.

Figure 4 shows a block diagram of the electrical components of the novel instrument constructed according to the invention. A saw-tooth generator 1 provides an output which has a voltage waveform as shown in Figure 5(a). The output is applied to amplitude control circuits 3, 5, 7 and 9 to produce four different voltages having the same frequency but of different amplitudes as shown in Figure 5(b to e). The frequency of the output voltage of generator 1 is illustrated as 800 cycles per second but is not critical and may be chosen from a wide range.

The outputs of amplitude control circuits 3 and 5 are applied to a switch 11 which may be of the diode type and is operated by a 400 cycles per second switching pulse generator 15 providing a square wave voltage of ½ the frequency of sawtooth generator 1 and having a voltage waveform as shown in Figure 5(i) so that one pulse from amplitude control circuit 3 passes in one-half cycle of switch pulse generator 15 and one pulse form amplitude control circuit 5 passes in the other half-cycle to provide an output voltage waveform at switch 11 as shown in Figure 5(f).

A switch 13 similar to switch 11 is also connected to switching pulse generator 15 and combines the signals from amplitude control circuits 7 and 9 in the same manner as does switch 11 with the signals from amplitude control circuits 3 and 5 to provide an output at switch 13 having a voltage waveform as shown in Figure 5(g).

The outputs of switches 11 and 13 are connected to a switch 17 which is controlled by a 200 cycle per second switching pulse generator 19 providing a voltage of ¼ the frequency of sawtooth generator 1 and operates in the same manner as switch 11. The output voltage waveform of switch 17 is shown in Figure 5(h).

A 50 cycle per second exponential sawtooth generator 25 having an output voltage waveform as shown in Figure 5(l) is connected to a switch 21, similar to switch 11. The output of switch 17 is also connected to switch 21. Switch 21 is operated by a 50 cycle per second asymmetric switching pulse generator 23 having an output voltage waveform as shown in Figure 5(k). The voltage waveform of generator 23 is chosen to permit the output of generator 25 to pass through switch 21 during the first ¾ of the cycle and the output from switch 17 during the remaining ¼ of the cycle. This arrangement with the frequencies chosen provides twelve horizontal sweeps during each cycle of generator 25 and and 4 sawtooth sweeps during each cycle. The output voltage waveform of switch 21 is shown in Figure 5(m). An exponential voltage waveform is chosen for generator 25 in order to obtain perspective spacing in the horizontal lines.

Sawtooth generator 1 and switching pulse generators 15, 19 and 23 have their outputs synchronized by a source of synchronizing voltage 37.

The output from a horizontal control circuit 29 is added to the signal from switch 21 to adjust the output level of the signal and place the uppermost horizontal line at the mid-tube position when the pitch attitude of the craft is normal. Horizontal control circuit 29 includes a pitch takeoff from a vertical gyro to raise or lower the horizontal lines in correspondence with changes that occur in the pitch attitude of the craft. The combined output from the horizontal control circuit 29 and switch 21 is applied to the vertical deflection circuit 6 of a cathode ray tube 4.

If the 50 cycles per second exponential sawtooth voltage from generator 25 has its frequency varied slightly, the horizontal lines produced on the tube will roll slowly. Should the frequency variation be increased the rate of roll will also increase. Therefore, a speed responsive variable frequency control circuit 27 is connected to generator 25 to vary the frequency of generator 25 as a function of the speed of the craft. This frequency is varied so that a rolling or movement of the horizontal lines in a downward direction corresponding to the speed of the craft will result.

The output of generator 1 is also connected to an 800 cycles per second sweep generator 33 having an output voltage waveform as shown in Figure 5(p). The output of generator 33 is applied to the horizontal deflection circuit 8 of cathode ray tube 4 to provide for the horizontal movement of the electron beam.

With the circuit described, a retrace line will appear between each horizontal line and at the end of each vertical sweep. This is avoided by providing electron beam blanking. A horizontal retrace blanking generator 35 is connected to the output of generator 33 and generates a voltage wave as shown in Figure 5(n) which is applied to the grid 10 of the cathode ray tube 4 to blank the horizontal retrace. A similar vertical retrace blanking generator 31 having an output voltage waveform as shown in Figure 5(o) is connected between the exponential sawtooth generator 25 and the grid 10 of the cathode ray tube 4 to blank the vertical retrace.

The invention provides a pictorial and instantaneous indicating device whereby a pilot can tell at a glance the attitude and relative speed of an aircraft without the necessity of correlating a number of readings.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A circuit for providing a sweep voltage to a deflection circuit of a cathode ray tube comprising a sawtooth generator, a plurality of amplitude control circuits connected thereto for providing voltages of several amplitudes, first electronic switching means connected to the amplitude control circuits for selectively passing portions of the output of each amplitude control circuit in a predetermined sequence, an exponential sawtooth generator, and second electronic switching means connected to the first electronic switching means and the exponential sawtooth generator for passing predetermined portions of the output from the first switching means and predetermined portions of the output from the exponential sawtooth generator in a predetermined sequence, and a source of reference voltage for synchronizing the sawtooth generator and the first and second switching means.

2. A device constructed according to claim 1 wherein the frequency of the exponential sawtooth generator is varied as a function of a variable parameter.

3. A device constructed according to claim 1 wherein the output from the switching means is combined with the output from a control circuit for adjusting the voltage level of the output waveform as a function of a variable parameter.

4. A circuit for providing a sweep voltage to a deflection circuit of a cathode ray tube comprising a sawtooth generator, an exponential sawtooth generator, an electronic switch energized by a switching generator having a predetermined output voltage waveform for combining the outputs from the sawtooth generator and the exponential sawtooth generator corresponding to the predetermined output voltage waveform of the switching generator.

5. A device constructed according to claim 4 wherein the frequency of the exponential sawtooth generator is varied as a function of a variable parameter.

6. A device constructed according to claim 4 wherein the output from the switching means is combined with the output from a control circuit for adjusting the voltage level of the output waveform as a function of a variable parameter.

7. A circuit for providing a sweep voltage to a deflection circuit of a cathode ray tube comprising a sawtooth generator, a pair of amplitude control circuits connected thereto for providing voltages of different amplitudes, a first electronic switch energized by a first switching generator for combining the outputs from the amplitude control circuits, an exponential sweep generator, a second electronic switch energized by a second switching generator having a predetermined output voltage waveform for combining the outputs from the first electronic switch and the exponential sawtooth generator corresponding to the predetermined output waveform of the second switching generator.

8. A device constructed according to claim 7 wherein the frequency of the exponential sawtooth generator is varied as a function of a variable parameter.

9. A device constructed according to claim 7 wherein the output from the switching means is combined with the output from a control circuit for adjusting the voltage level of the output waveform as a function of a variable parameter.

10. A circuit for providing a sweep voltage to a deflection circuit of a cathode ray tube comprising a sawtooth generator, four amplitude control circuits connected thereto for providing voltages of four different amplitudes, a first electronic switch connected to two of said amplitude control circuits and a second electronic switch connected to the remaining two, a switching generator connected to the first and second electronic switches for alternately passing the voltages in the amplitude control circuits through the respective switches, a third electronic switch connected to the first and second electronic switches and energized by a second switching generator for alternately passing the outputs from the first and second electronic switches, an exponential sawtooth generator, a fourth electronic switch energized by a third switching generator having a predetermined output voltage waveform for alternately passing the voltage from the third electronic switch and the exponential sawtooth generator corresponding to the predetermined output voltage waveform of the third switching generator.

11. A device constructed according to claim 10 wherein the frequency of the exponential sawtooth generator is varied as a function of a variable parameter.

12. A device constructed according to claim 10 wherein the output from the switching means is combined with the output from a control circuit for adjusting the voltage level of the output waveform as a function of a variable parameter.

13. A cathode ray tube indicating device comprising a circuit for providing a sweep voltage to one of the deflection circuits of a cathode ray tube, said circuit comprising a sawtooth generator, a plurality of amplitude control circuits connected thereto for providing voltages of several amplitudes, first electronic switching means connected to the amplitude control circuits for selectively passing portions of the output of each amplitude control circuit in a predetermined sequence, an exponential sawtooth generator having its frequency varied as a function of the speed of a craft, second electronic switching means connected to the first electronic switching means and the exponential sawtooth generator for passing predetermined portions of the output from the first switching means and predetermined portions of the output from the exponential sawtooth generator, a control circuit connected to the second electronic switching means for adjusting the voltage level of the output from the second electronic switching means as a function of the pitch attitude of the craft, a sawtooth sweep generator connected to the other deflection circuit of the cathode ray tube, means connected to the output of the sawtooth sweep generator and the output of the exponential sawtooth generator for applying horizontal and vertical retrace blanking pulses to the cathode ray tube, and a source of synchronizing voltage applied to the sawtooth generator and the first and second electronic switching means for synchronizing the outputs to the cathode ray tube.

14. A cathode ray tube indicating device comprising a circuit for providing a sweep voltage to one of the deflection circuits of a cathode ray tube, said circuit comprising a sawtooth generator, an exponential sawtooth generator having its frequency varied as a function of the speed of a craft, an electronic switch energized by a switching generator having a predetermined output voltage waveform for combining the outputs from the sawtooth generator and the exponential sawtooth generator corresponding to the predetermined output voltage waveform of the switching generator, a control circuit connected to the electronic switch for adjusting the voltage level of the output from the electronic switch as a function of the pitch attitude of the craft, a sawtooth sweep generator connected to the other deflection circuit of the cathode ray tube, means connected to the output of the sawtooth sweep generator and the output of the exponential sawtooth generator for applying horizontal and vertical retrace blanking pulses to the cathode ray tube.

15. A cathode ray tube indicating device comprising a circuit for providing a sweep voltage to one of the deflection circuits of a cathode ray tube, said circuit comprising a sawtooth generator, a pair of amplitude control circuits connected thereto for providing voltages of different amplitudes, a first electronic switch energized by a first switching generator for combining the outputs from the amplitude control circuits, an exponential sweep generator having its frequency varied as a function of the speed of a craft, a second electronic switch energized by a second switching generator having a predetermined output voltage waveform for combining the outputs from the first electronic switch and the exponential sawtooth generator corresponding to the predetermined output waveform of the second switching generator, a control circuit connected to the second electronic switch for adjusting the voltage level of the output from the second electronic switch as a function of the pitch attitude for the craft, a sawtooth sweep generator connected to the other deflection circuit of the cathode ray tube, means connected to the output of the sawtooth sweep generator and the output of the exponential sawtooth generator for applying horizontal and vertical retrace blanking pulses to the cathode ray tube.

16. A cathode ray tube indicating device comprising a circuit for providing a sweep voltage to one of the deflection circuits of a cathode ray tube, said circuit comprising a sawtooth generator, four amplitude control circuits connected thereto for providing voltages of four different amplitudes, a first electronic switch connected to two of said amplitude control circuits and a second electronic switch connected to the remaining two, a switching generator connected to the first and second electronic switches for alternately passing the voltages in the amplitude control circuits through the respective switches, a third electronic switch connected to the first and second electronic switches and energized by a second switching generator for alternately passing the voltage outputs from the first and second electronic switches, an exponential sawtooth generator having its frequency varied as a function of the speed of a craft, a fourth electronic switch energized by a third switching generator having a predetermined output voltage waveform for alternately passing the voltage from the third electronic switch and the exponential sawtooth generator corresponding to the predetermined output voltage waveform of the third switching generator, a control circuit connected to the fourth electronic switch for adjusting the voltage level of the output from the fourth electronic switch as a function of the pitch attitude of the craft, a sawtooth sweep generator connected to the other deflection circuit of the cathode ray tube, means connected to the output of the sawtooth sweep generator and the output of the exponential sawtooth generator for applying horizontal and vertical retrace blanking pulses to the cathode ray tube.

17. An indicator for indicating the pitch attitude and speed of a craft, comprising a cathode ray tube, and circuit means connected to the deflection circuits of the tube for applying signals thereto to provide a series of horizontal lines moving downwardly on the tube, means responsive to speed of the craft for varying the signals to move the lines at a rate corresponding to the speed of the craft, and means responsive to pitch attitude of the craft to raise and lower the uppermost line to indicate pitch attitude of the craft.

18. An indicator for indicating the pitch attitude and speed of a craft, comprising a cathode ray tube, and circuit means connected to the deflection circuits of the tube for applying signals thereto to represent a grid pattern of the ground in perspective comprising a series of horizontal lines increasingly spaced from one another and converging lines at angles to the horizontal lines, and means for modifying the signals in response to attitude changes of the craft so that the uppermost horizontal line corresponds to the pitch attitude of the craft, and means for further modifying the signals in response to craft speed so that the horizontal lines move downwardly on the tube at a rate corresponding to craft speed.

References Cited in the file of this patent

UNITED STATES PATENTS

| | | |
|---|---|---|
| 2,062,003 | Hammond | Nov. 24, 1936 |
| 2,146,862 | Shumard | Feb. 14, 1939 |
| 2,292,045 | Burnett | Aug. 4, 1942 |
| 2,479,195 | Alvarez | Aug. 16, 1949 |
| 2,488,022 | Miller | Nov. 15, 1949 |
| 2,513,962 | Patterson | July 4, 1950 |
| 2,577,758 | Hastings | Dec. 11, 1951 |
| 2,584,144 | Maresca | Feb. 5, 1952 |
| 2,762,949 | Huffman | Sept. 11, 1956 |

FOREIGN PATENTS

| | | |
|---|---|---|
| 157,494 | Australia | July 7, 1954 |